United States Patent [19]
Omi

[11] Patent Number: 5,625,432
[45] Date of Patent: Apr. 29, 1997

[54] CAMERA WITH FILM DETECTION AND METHOD

[75] Inventor: Junichi Omi, Kanagawa-ken, Japan

[73] Assignee: Nikon Corporation, Tokyo, Japan

[21] Appl. No.: 603,866

[22] Filed: Feb. 22, 1996

[30]      Foreign Application Priority Data

Feb. 23, 1995  [JP]  Japan ..................... 7-035752

[51] Int. Cl.⁶ ................ G03B 17/02; G03B 7/00
[52] U.S. Cl. ............................. 396/284; 396/538
[58] Field of Search ...................... 354/173.1, 21, 354/202, 288

[56]           References Cited

U.S. PATENT DOCUMENTS

| | | | |
|---|---|---|---|
| 4,939,531 | 7/1990 | Sawamura et al. | 354/173.1 |
| 5,231,438 | 7/1993 | Smart | 354/288 |
| 5,255,034 | 10/1993 | Shimada et al. | 354/173.1 |
| 5,452,036 | 9/1995 | Kamata | 354/288 |

FOREIGN PATENT DOCUMENTS 60-98424  6/1985  Japan .

*Primary Examiner*—Safet Metjahic
*Assistant Examiner*—Eddie C. Lee
*Attorney, Agent, or Firm*—Oliff & Berridge

[57]           ABSTRACT

A camera having a detection assembly and method are capable of detecting a top edge or a bottom edge of film. The camera includes a film detection assembly positioned within a camera body to detect one of the top edge and the bottom edge of the film. The film detector assembly includes a force detection assembly that detects a force exerted by one of the top edge and the bottom edge of the film. The film detection assembly also includes a film indication assembly to indicate the presence of film within the camera. The film indication assembly is connected to the force detection assembly. The film indicator assembly includes a switch assembly that opens and closes in response to the absence or presence of film within the camera.

15 Claims, 3 Drawing Sheets

CAMERA WITH FILM DETECTION AND METHOD

BACKGROUND OF THE INVENTION

1. Field of the Invention

The present invention relates to a camera capable of detecting the absence or presence of film within the camera and a method for detecting the presence or absence of film within the camera.

2. Discussion of Related Art

A conventional camera equipped with a film detection function is disclosed in Japanese Unexamined Patent Publication Sho 60-98424. The camera includes a detection pin positioned within the front of the camera opposite a film surface. A normally closed detection switch opens when the detection pin is moved in a direction of the camera optical axis by the film. This arrangement increases the thickness of the camera in the direction of the camera optical axis because it is necessary to provide space in the front of the camera ahead of the film plane for the detection device. Space must be provided for both the detection pin and the detection switch that opens and closes in response to the detection pin.

SUMMARY OF THE INVENTION

An object of the present invention is to overcome the above problems by providing a camera capable of detecting the absence or presence of film within the camera such that a thickness of the camera in the direction of the camera optical axis is not increased.

This and other objects are achieved by providing a camera having a detection assembly that is capable of detecting a top edge or a bottom edge of film. The camera includes a camera body and a film receiving assembly positioned within the camera body that receives the film. A film detection assembly is positioned within the camera body to detect one of the top edge and the bottom edge of the film.

The film detection assembly detects a force exerted by one of the top edge and the bottom edge of the film. The film detection assembly preferably includes a lever that contacts one of the top edge and the bottom edge of the film when film is positioned within the camera. The film detection assembly also includes a film indication assembly to signal the presence of film loaded within the camera. The film indicator assembly includes a switch assembly that opens and closes in response to the absence or presence of film within the camera.

The film receiving assembly includes an opening to permit loading and unloading of film within the camera. The film receiving assembly also includes a cover that covers the opening. The camera also include a cover opening prevention assembly that prevents the cover from being opening when the film detection assembly detects the presence of film within the camera. The cover opening prevention assembly includes a releasable key assembly that engages the cover when film is loaded into the camera to prevent the opening of the cover when film is loaded into the camera. A sliding regulating member engages the key assembly when film is loaded into the camera to prevent movement of the key assembly to prevent opening of the cover when film is loaded into the camera. The sliding regulating member slides in response to movement of the lever of the film detection assembly. The sliding regulating member is connected to the lever through a pivoting connection lever.

A method of detecting the presence of film within a camera is also disclosed. The method includes detecting one of the top edge and the bottom edge of the film to detect the presence of film within the camera. The film is detected by detecting a force exerted by one of the top edge and the bottom edge of the film when film is present within the camera. The method also includes indicating the presence of film within the camera when film is present within the camera.

BRIEF DESCRIPTION OF DRAWINGS

The invention will be described in conjunction with the following drawings in which like reference numerals designate like elements and wherein.

DETAILED DESCRIPTION OF PREFERRED EMBODIMENTS

Figure 1:
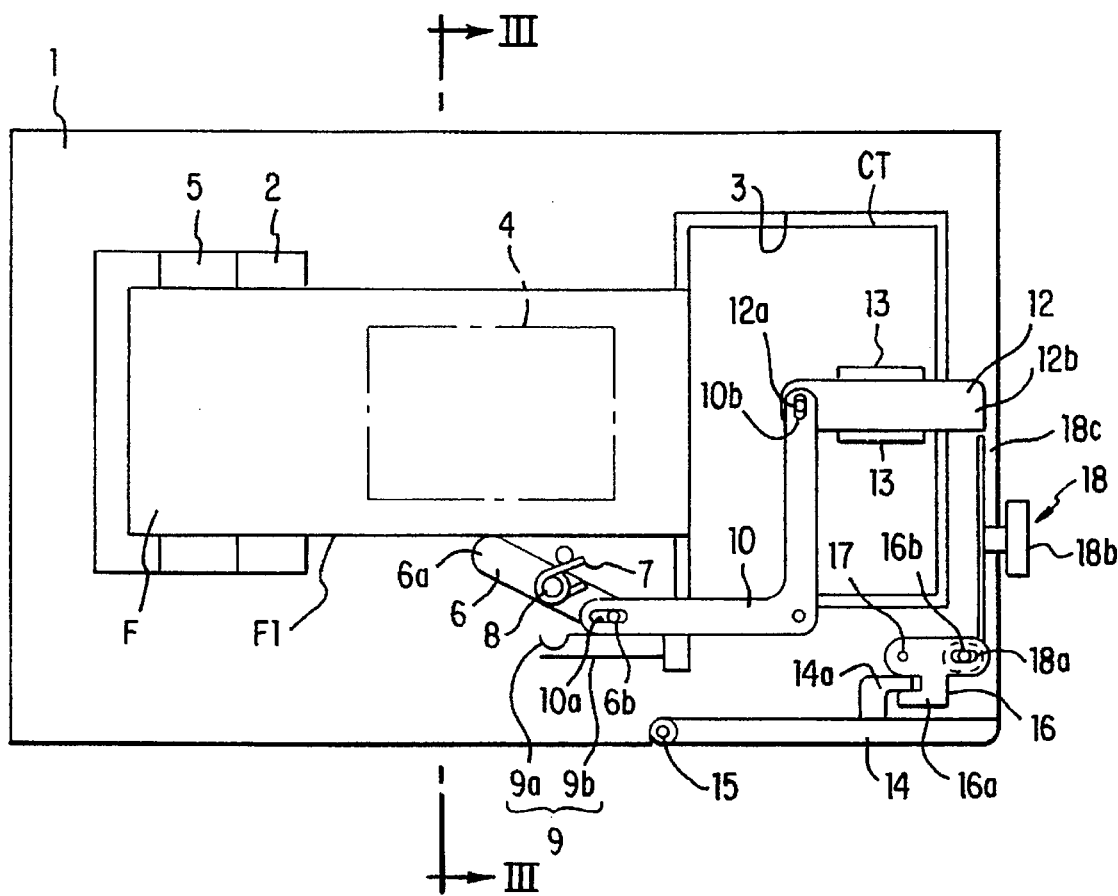
FIG. 1 is a rear interior schematic view of an embodiment of a camera capable of detecting the absence or presence of film when film is loaded in the camera.
Figure 2:
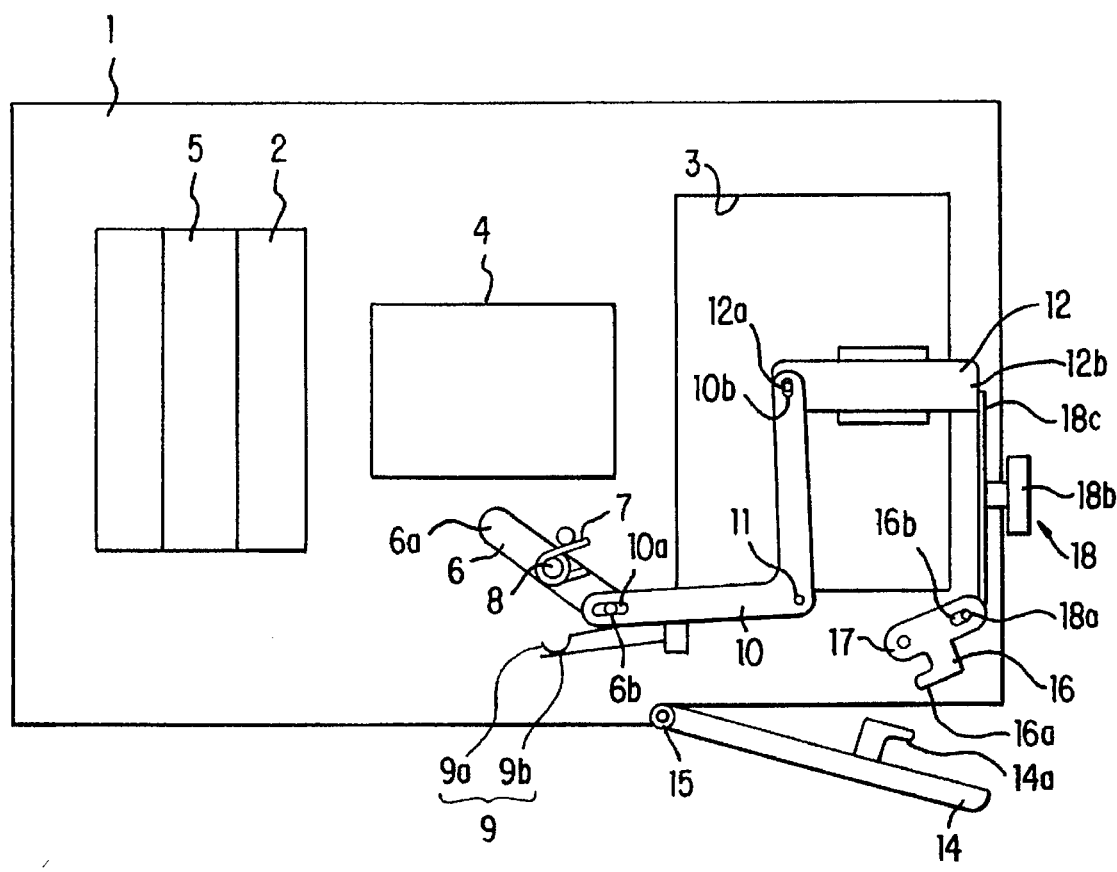
FIG. 2 is a rear interior schematic view of the camera shown in FIG. 1 when film is not loaded in the camera.

FIGS. 1 and 2 illustrate a camera having a film detection function according to an embodiment of the present invention. FIG. 1 illustrates a camera body 1 having a back portion removed. A spool chamber 2 is formed within the camera body 1, for example, on a left side of the camera body 1. A cartridge chamber 3 is formed within the camera body 1, for example, on a right side of the camera body 1. An aperture 4 is formed within the body 1 between the chambers 2 and 3. A spool 5 is positioned within the spool chamber 2 and is capable of being rotated by a drive device (not shown). A film cartridge CT housing film F may be loaded into the cartridge chamber 3.

A film detection lever 6 is positioned within the camera body 1. The lever 6 is preferably positioned below film F within the camera body 1. However, the lever 6 and its associated assembly may be located above the film F in the same fashion. The detection lever 6 is supported such that it is capable rotating about a pin 8 such that a tip 6a of the lever 6 comes into contact with a bottom edge F1 of film F. The detection lever 6 is biased in a clockwise direction by a torsion spring 7 attached to the pin 8. A detection switch 9 is fixed to the camera body 1 and is provided to detect the presence of film F within the camera body 1.

When film F is not present (i.e., the camera 1 is not loaded with film F), the film detection lever 6 rotates to a position shown in FIG. 2 under the force of the spring 7. The rotation of the detection lever 6 causes a pair of switch contacts 9a and 9b to be pressed downward and contact each other, as shown in FIG. 2. The detection switch 9 closes a circuit to generate a signal that indicates that no film is present within the camera.

When film F is present (i.e., the camera is loaded with film), the film detection lever 6 rotates in a counterclockwise direction to a position shown in FIG. 1 due to interference with the film F. In this case, the lever 6 rotates opposite the force of the spring 7. The pair of switch contacts 9a and 9b do not contact each other, and the detection switch 9 opens the circuit to generate a signal that indicate that film is present within the camera.

A connection lever 10 is supported within the camera body 1 and is capable of rotating about a pin 11. A hole 10a, such as, for example, an oval slot as shown in FIGS. 1 and 2 is located in one end of the lever 10. A pin 6b protrudes from one end of the film detection lever 6 and is positioned within the hole 10a. A regulation member 12 is positioned within the camera body and includes a pin 12a protruding from an end. The pin 12a engages another hole 10b in an opposite end of the connection lever 10. The regulation member 12 is supported within the camera body 1 such that it is capable sliding within a guide unit 13. The regulation member 12 slides in response to the rotational motion of the connecting lever 10.

A cartridge cover 14 is located on the camera body 1 and rotates about a shaft 15. The cartridge cover 14 covers the opening to the cartridge chamber 3. A cartridge cover engagement stop member 16 is positioned within the camera body 1 and is capable of rotating about a shaft 17. A key 16a engages a key 14a on the cartridge cover 14 to prevent opening the cover 14. A cartridge chamber opening and closing operation member 18 having a pin 18a engages a hole 16b in the engagement stop member 16, as shown in FIGS. 1 and 2. When the knob 18b of the operation member 18 is moved upward, the engagement stop member 16 rotates in a counterclockwise direction about the shaft 17, as shown in FIG. 2. This movement releases the engagement between the key 16a and the key 14a. The cartridge cover 14 is then released by a spring (not shown).

When film is loaded with the camera body 1, the rotation of the detection lever 6 causes the connecting lever 10 to rotate, moving the regulation member 12 to the position shown in FIG. 1. This positioning of the regulation member 12 prevents the upward movement of the operation member 18. As a result, the cartridge cover 14 may not be released at this time.

Figure 3:
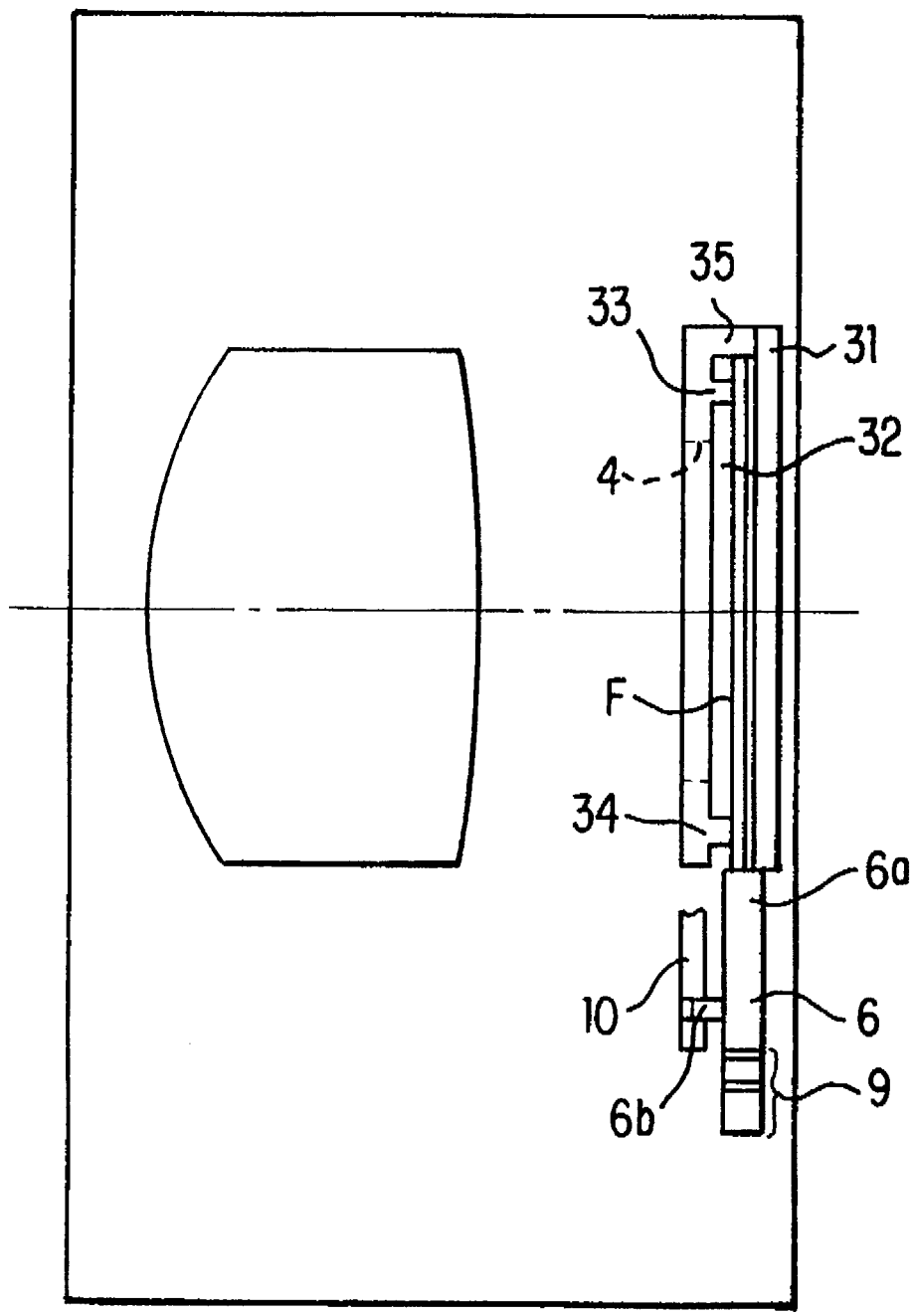
FIG. 3 is a schematic cross-sectional view taken along line III—III in FIG. 1.

As shown in FIG. 3, a pressure plate 31 is provided near the back of the camera body 1. A film supply passage 32 is formed between the pressure plate 31 and the camera body 1. A top rail 33 and a bottom rail 34 are parallel with a top edge and a bottom edge of the aperture 4, as is commonly known. The film F scrolls within the passage 32 formed between the top and bottom rails 33 and 34 and the pressure plate 31. The position of the film F in the direction of the optical axis is restricted by the space between the top and bottom rails 33 and 34 and the pressure plate 31. The position of the film F in the vertical direction of the camera is restricted by a top surface 35 of passage 32. The above-described film detection lever 6 is positioned with one edge 6a opposite the bottom edge surface F1 of the film F such that the lever 6 is rotated when the bottom edge surface F1 of the film F contacts the edge 6a.

As shown in FIG. 1 when film F is scrolled from the cartridge CT, the film detection edge 6a of the film detection lever 6 is depressed downward by the edge surface F1 of the film. The film detection lever 6 is rotated in the counterclockwise direction opposite the force of the spring 7. The switch contacts 9a and 9b open with the rotation of the film detection lever 6 in the counterclockwise direction, and a signal indicating that the film is loaded is output from the switch 9. At this time, the connecting lever 10 rotates in a clockwise direction about the shaft 11, and the regulating member 12 moves to the right from the position shown in FIG. 2 to the position shown in FIG. 1. The regulating member 12 protrudes above the operating path of the opening and closing operation member 18. Accordingly, even when an attempt is made to move the operation member 18, the top edge surface 18c of the operation member 18 contacts the bottom edge surface 12b of the regulating member 12 as shown in FIG. 1. Movement of the operation member 18 is prevented. As a result, the engagement stop member 16 does not rotate, and the cartridge cover 14 may not be opened.

When film is not loaded in the camera, as shown in FIG. 2, or when the film F has been rewound into the cartridge CT, the film detection lever 6 rotates in a clockwise direction by spring 7. The contacts 9a and 9b of the detection switch 9 are closed by the film detection lever 6, and a signal indicating that film is not loaded is output from the switch 9. At this time, the connection lever 10 rotates in a counterclockwise direction and the regulating member 12 slides to the left as shown in FIG. 2. Accordingly, the regulating member 12 is withdrawn from the operating path of the operating member 18 as shown in FIG. 2. The top edge surface 18c of the operation member 18 and the bottom edge surface 12b of the regulating member 12 do not interfere with each other such that operation of the operation member 18 in the upward direction is possible. When the operation member 18 is slid upward, the engagement stop member 16 rotates in a counterclockwise direction about the shaft 17 so that the engagement stop between the key 16a and the key 14a of the cartridge cover 14 is released, thereby allowing the cartridge cover 14 to be opened.

The film absence signals and the film presence signals are supplied to a control unit, not shown, and are used in camera operating processes such as image loading detection and various other controls of the camera.

In the above-described embodiment, the film detection lever 6 is depressed by the bottom edge surface F1 of the film F and is positioned below the film. The detection switch 9 that opens and closes in response to the rotation of the detection lever 6 is also positioned below the film F. Consequently, it is not necessary to provide space for the film detection device in the front or back of the camera as is necessary in conventional models. As a result, the thickness of the camera can be reduced. In addition, when the film is loaded, the film detection lever rotates in the counterclockwise direction in opposition to the spring force of the spring 7, thereby preventing the action of opening the cartridge cover 14. Consequently, it is possible to prevent erroneous operations wherein the cartridge cover 14 might be opened despite the fact that the film has been loaded.

Alternatively, the film detection lever 6 and the film detection switch 9 may be positioned above the film in the same manner. In addition, in the above-described embodiment the movement of the detection lever 6 is transferred to the regulating member 12 by a linking mechanism, however, a gear mechanism may be employed. Furthermore, the opening and closing of the cartridge cover 14 is controlled through mechanically linking to the film detection action of the film detection lever 6, however, electronic control of the cover 14 may also be used. Alternatively, a sensor may be provided that detects the force from the edge surface of the film.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. A camera capable of detecting a presence of film, the film having a front surface, a back surface, a top edge, and a bottom edge, said camera having a front, a back, a top portion, and a bottom portion, said camera comprising:

a camera body;

a film receiving assembly positioned within said camera body, said film receiving assembly including an opening for receiving the film and a cover for said opening;

a film detection assembly positioned within said camera body detecting the presence of film loaded into the camera by detecting a force exerted by one of the top edge and the bottom edge of the film on said film detection assembly; and a cover opening prevention assembly connected to said film detection assembly preventing said cover from being opened when said film detection assembly detects the presence of film loaded into said camera.

2. The camera according to claim 1, wherein said film detection assembly includes a lever disposed within the camera body that contacts one of the top edge and the bottom edge of the film when film is loaded into said camera.

3. The camera according to claim 1, wherein said film detection assembly includes a film indication assembly that signals the presence of film loaded within said camera based on detection of the film by the film detection assembly.

4. The camera according to claim 3, wherein said film indicator assembly includes a switch assembly that electrically connects and disconnects in response to the absence or presence of film within said camera.

5. The camera according to claim 4, wherein said switch assembly includes a pair of normally closed switch contact arms that open when the film detection assembly detects the force exerted by one of the top edge and bottom edge of the film.

6. The camera according to claim 1, wherein said cover opening prevention assembly includes a releasable key assembly that engages said cover when film is loaded into the camera to prevent opening of said cover when film is loaded into said camera.

7. The camera according to claim 6, wherein said cover opening prevention assembly includes a sliding regulating member that engages said key assembly when film is loaded into the camera to prevent movement of said key assembly to prevent opening of said cover when film is loaded into said camera.

8. The camera according to claim 7, wherein said film detection assembly includes a lever disposed within the camera body that contacts one of the top edge and the bottom edge of the film when film is loaded into said camera and said sliding regulating member slides in response to movement of said lever.

9. The camera according to claim 8, wherein said sliding regulating member is connected to said lever through a pivoting connection lever.

10. A camera capable of detecting a presence of film, the film having a front surface, a back surface, a top edge, and a bottom edge, said camera having a front, a back, a top portion, and a bottom portion, said camera comprising:

a camera body;

a film receiving assembly positioned within said camera body, said film receiving assembly including an opening for receiving the film and a cover for said opening;

a switch assembly positioned adjacent to the film when the film is received within said camera body, said switch assembly opening in response to a force applied by one of the bottom edge and the top edge of the film on said switch assembly when the film is loaded into the camera; and a cover opening prevention assembly connected to said switch assembly preventing said cover from being opened when said switch assembly is open.

11. The camera according to claim 10, wherein said switch assembly includes a pair of contact arms that contact each other when the film is not loaded in the camera and that break contact with each other when the film is loaded in the camera.

12. The camera according to claim 11, wherein said switch assembly includes a lever that contacts one of the top edge and the bottom edge of the film when film is loaded into said camera, said lever engaging said pair of contact arms such that said contact arms break contact with each other when the film is loaded in the camera and said contact arms contact each other when the film is not loaded in the camera.

13. A camera capable of detecting a presence of film, the film having a front surface, a back surface, a top edge, and a bottom edge, said camera comprising:

a camera body;

film receiving means positioned within said camera body, said film receiving means including an opening and cover means for covering said opening;

film detection means positioned within said camera body for detecting a force exerted by one of the top edge and the bottom edge of the film on said film detection means to detect the presence of film loaded within the camera; and prevention means connected to said film detection means for preventing said cover means from opening when said film detection means detects the presence of film within said camera.

14. The camera according to claim 13, wherein said film detection means includes film indication means for signalling the presence of film within said camera.

15. A method of detecting the presence of film within a camera and for preventing accidental opening of the camera, said film having a front surface, a back surface, a top edge, and a bottom edge, said camera having a camera body, a film receiving assembly positioned within the camera body that receives the film, said film receiving assembly including an opening and a cover for said opening, and a film detection assembly positioned within the camera body, said method comprising:

detecting with the film detection assembly a force exerted by one of the top edge and the bottom edge of the film on the film detection assembly;

indicating the presence of film within the camera when film is loaded within the camera; and preventing opening of the cover when the presence of film is detected within the camera.

\* \* \* \* \*